(12) United States Patent
Onikiri et al.

(10) Patent No.: US 7,932,890 B2
(45) Date of Patent: Apr. 26, 2011

(54) LIGHTGUIDE PLATE AND ELECTRONIC DEVICE

(75) Inventors: Akira Onikiri, Fujiyoshida (JP); Daisaku Okuwaki, Fujiyoshida (JP); Yasuaki Kayanuma, Fujiyoshida (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 342 days.

(21) Appl. No.: 12/201,471

(22) Filed: Aug. 29, 2008

(65) Prior Publication Data

US 2009/0059618 A1 Mar. 5, 2009

(30) Foreign Application Priority Data

Aug. 30, 2007 (JP) ................................. 2007-224929
Aug. 30, 2007 (JP) ................................. 2007-224932

(51) Int. Cl.
*F21V 7/04* (2006.01)

(52) U.S. Cl. ............. 345/102; 361/679.11; 361/679.17; 345/176

(58) Field of Classification Search .................. 345/176, 345/102, 168–172; 361/679.23–679.24, 361/679.11–679.17; 362/602
See application file for complete search history.

(56) References Cited

U.S. PATENT DOCUMENTS

| 6,247,826 | B1 | 6/2001 | Funamoto et al. |
| 6,688,790 | B2 * | 2/2004 | Ito ................................. 400/490 |
| 6,926,418 | B2 * | 8/2005 | Ostergård et al. ............... 362/24 |
| 7,034,799 | B2 * | 4/2006 | Lee ................................ 345/102 |
| 7,188,989 | B2 | 3/2007 | Miyashita |
| 2008/0019117 | A1 * | 1/2008 | Ng et al. ......................... 362/85 |
| 2008/0266873 | A1 * | 10/2008 | Chang ........................... 362/309 |

FOREIGN PATENT DOCUMENTS

| JP | 2001-358816 A | 12/2001 |
| JP | 2002-49439 A | 2/2002 |

* cited by examiner

*Primary Examiner* — Anabel M Ton
(74) *Attorney, Agent, or Firm* — Brinks Hofer Gilson & Lione

(57) ABSTRACT

An electronic device includes a casing having a display part (2) provided with an image display panel (1), a operation part (4) provided with operation keys (3), and a joint part (5) that connects together the display part and the operation part, and a lightguide plate (6) disposed in the casing. The lightguide plate is an edge-light type lightguide plate having a display illuminating part (6a) illuminating the image display panel, a key illuminating part (6b) illuminating the operation keys, and a connecting part (6c) that connects together the display illuminating part and the key illuminating part and that guides light therebetween. The lightguide plate is deformable in accordance with the deformation of the casing.

23 Claims, 13 Drawing Sheets

Fig. 2
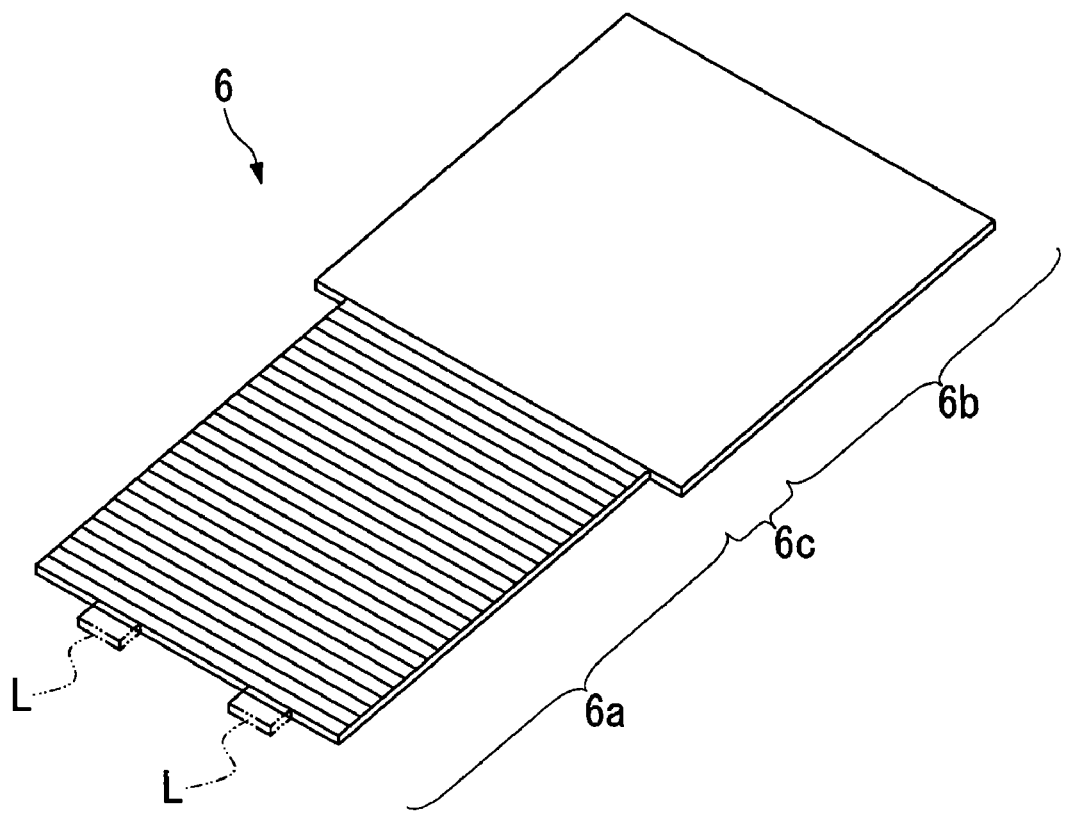
(a)
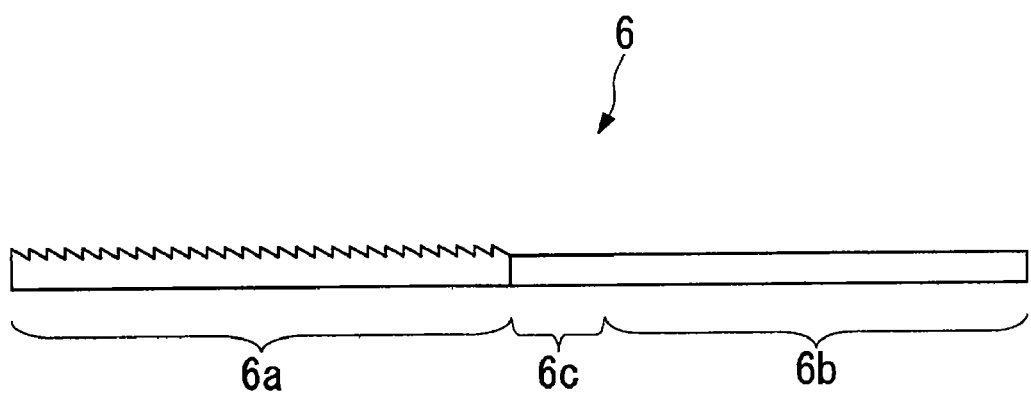
(b)

Fig. 6
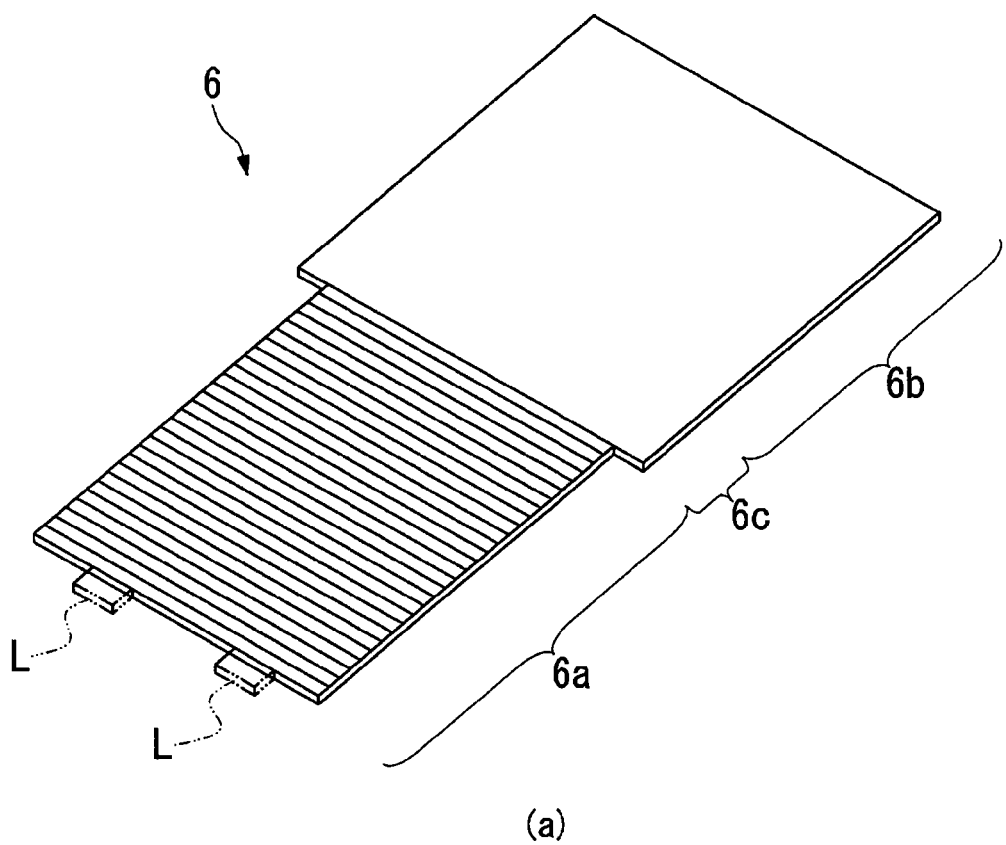
(a)
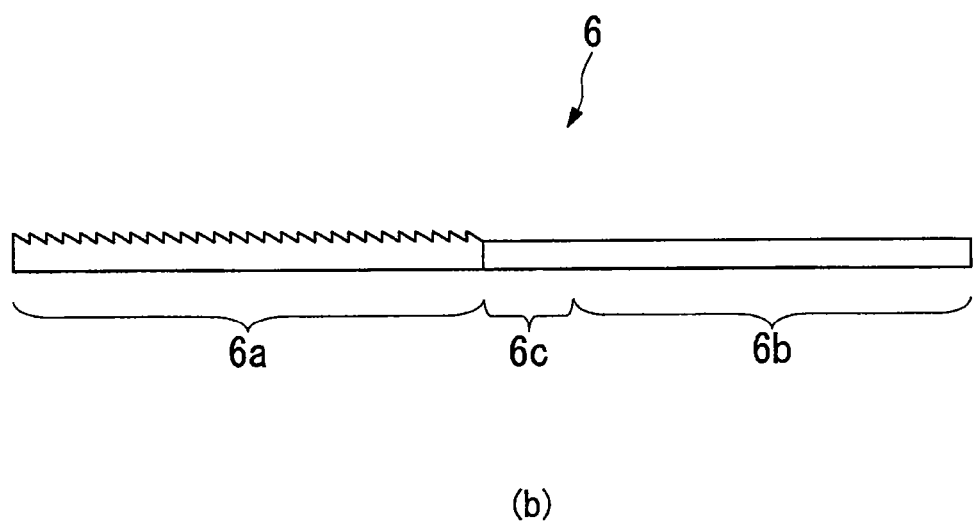
(b)

LIGHTGUIDE PLATE AND ELECTRONIC DEVICE

REFERENCE TO THE RELATED APPLICATIONS

This application claims priority under 35 U.S.C. §119 to Japanese Patent application No. JP2007-224929 filed on Aug. 30, 2007 and Japanese Patent application No. JP2007-224932 filed on Aug. 30, 2007, the entire contents of which are hereby incorporated by reference.

BACKGROUND OF THE INVENTION

1. Field of the Invention

The present invention relates to an electronic device, e.g. a mobile phone, having a lightguide plate used in a planar light source that illuminates a liquid crystal display panel and operation keys of the electronic device.

2. Description of the Related Arts

Liquid crystal display apparatus for image display are widely used in displays of mobile phones, personal digital assistants (PDAs), mobile personal computers (PCs), automatic teller machines (ATMs), etc. These liquid crystal display apparatus employ a backlight unit that applies illuminating light to a liquid crystal display panel from the back thereof to enhance the luminance of the display screen. The backlight unit uses a lightguide plate that guides light from a light source, e.g. a fluorescent lamp or light-emitting diode (LED) light source, and that emits the light toward the liquid crystal display panel from the entire area of a light exiting surface thereof. In the meantime, electronic devices such as mobile phones use operation keys and employ a light source that illuminates the operation keys from the back thereof, for example, to facilitate operations performed in dark.

Regarding such electronic devices, Japanese Patent Application Publication No. 2001-358816, for example, proposes a lighting device for an electronic device that uses a single sheet-shaped lightguide plate comprising a first lighting part that illuminates a liquid crystal panel, and a second lighting part that illuminates a key operation part having a plurality of operation keys. Japanese Patent Application Publication No. 2002-49439 proposes a foldable electronic device that has a lightguide plate for a liquid crystal panel and a lightguide plate for a key operation part separately from each other. The lightguide plate for the liquid crystal panel receives light from an LED or other light source through one end edge surface thereof and emits a part of the light from the other end edge surface thereof. The lightguide plate for the key operation part receives the part of the light emitted from the lightguide plate for the liquid crystal panel and uses the light to illuminate the key operation part.

SUMMARY OF THE INVENTION

The lightguide plate according to the foregoing first conventional art is in the shape of a single sheet, as stated above, and hence suitable for use in an electronic device of the type in which a liquid crystal panel and a key operation part are disposed in substantially the same plane and mounted in a single casing. This lightguide plate is, however, unsuitable for use in an electronic device in which a liquid crystal panel and a key operation part are curved, or in which these components are not in the same plane. The lightguide plate is also unsuitable for use in a foldable electronic device in which a display part and a key operation part are mounted in respective casings, and the two casings are hinged to each other. The electronic device according to the foregoing second conventional art requires two lightguide plates for a liquid crystal panel and a keyboard and needs a special arrangement to transfer light between the two lightguide plates at the hinged joint therebetween, resulting in an increase in the number of components and an increase in production cost. Particularly, the hinged joint becomes complicated in structure, and the freedom for structural design and the reduction in thickness and weight are unfavorably limited to a considerable extent.

Accordingly, an object of the present invention is to solve the above-described problems with the conventional art.

The present invention provides an electronic device including a casing having a display part provided with an image display panel, a operation part provided with operation keys, and a joint part that connects together the display part and the operation part. The electronic device further includes a lightguide plate having a display illuminating part disposed in the display part to illuminate the image display panel, a key illuminating part disposed in the operation part to illuminate the operation keys, and a connecting part disposed in the joint part to connect together the display illuminating part and the key illuminating part and to guide light therebetween. The lightguide plate is deformable in accordance with the deformation of the casing.

This electronic device uses a single deformable lightguide plate to cope with the deformation of the casing and to illuminate both the image display panel and the operation keys, thereby solving the above-described problems with the conventional art.

Regarding the casing, the display part and the operation part may be hingedly connected together through the joint part.

Specifically, the lightguide plate may be in the shape of a film as a whole. In a case where the joint part is a hinged joint part, the hinged joint part may be in the shape of a pliable film.

The lightguide plate may be an edge-light type lightguide plate that receives light from at least one of opposite end edges thereof one of which is in the display part and the other of which is in the operation part and that guides the light toward the end edge opposite to the at least one of the opposite end edges.

The electronic device may further include a reflecting sheet for the connecting part that is disposed to cover at least one of the two opposite sides of the connecting part of the lightguide plate in the joint part. The reflecting sheet prevents leakage of light from the joint part.

The display part and the operation part may be each in the shape of a flat plate and hingedly connected to each other.

In another specific example, the electronic device may be arranged as follows. The display part has a surface provided with the image display panel. The operation part has a surface equipped with the operation keys. The display part and the operation part are displaceable between a folded position where the surface provided with the image display panel and the surface equipped with the operation keys are laid over each other and an unfolded position where the surface provided with the image display panel and the surface equipped with the operation keys are apart from each other.

In the unfolded position, the surface provided with the image display panel and the surface equipped with the operation keys may be positioned substantially flush with each other.

In another form of the electronic device, the display part and the operation part may be connected together to be positioned with a step therebetween in the unfolded position.

In another form thereof, the electronic device may be arranged as follows. The display part has a curved surface provided with the image display panel. The operation part has a curved surface equipped with the operation keys. The display part and the operation part are displaceable between a folded position where the electronic device is folded at the joint part and the surface provided with the image display panel and the surface equipped with the operation keys are close to each other, and an unfolded position where the surface provided with the image display panel and the surface equipped with the operation keys are apart from each other.

The joint part may not be a hinged joint part as stated above. That is, the arrangement may be as follows. The casing is a one-piece casing having at least either one of curved deformation and bent deformation, and the lightguide plate is deformed in accordance with the deformation of the casing.

In this case, the casing may be configured in a variety of forms. In a first form, the operation part has a flat surface equipped with the operation keys. The display part has a surface provided with the image display panel. This surface faces in the same direction as the surface equipped with the operation keys and is convexly curved as seen in a side view. The lightguide plate is configured in accordance with the surface of the operation part and the surface of the display part. In the following forms, the lightguide plate is configured in the same way as the above.

In a second form, the operation part has a flat surface equipped with the operation keys. The display part has a surface provided with the image display panel. This surface faces in the same direction as the surface equipped with the operation keys and is concavely curved as seen in a side view.

In a third form, the operation part has a surface equipped with the operation keys. The display part has a surface provided with the image display panel. The surface equipped with the operation keys and the surface provided with the image display panel are cooperating to form a continuous surface convexly curved as a whole as seen in a side view.

In a fourth form, the operation part has a surface equipped with the operation keys. The display part has a surface provided with the image display panel. The surface equipped with the operation keys and the surface provided with the image display panel are cooperating to form a continuous surface concavely curved as a whole as seen in a side view.

In a fifth form, the operation part has a convexly curved surface equipped with the operation keys. The display part has a concavely curved surface provided with the image display panel. The surface equipped with the operation keys and the surface provided with the image display panel cooperate to form a continuous surface curved in an S-shape as a whole as seen in a side view.

In a sixth form, the operation part has a concavely curved surface equipped with the operation keys. The display part has a convexly curved surface provided with the image display panel. The surface equipped with the operation keys and the surface provided with the image display panel cooperate to form a continuous surface curved in an S-shape as a whole as seen in a side view.

In a seventh form, the operation part has a flat surface equipped with the operation keys. The display part has a flat surface provided with the image display panel. The surface equipped with the operation keys and the surface provided with the image display panel are disposed with an angle of intersection therebetween.

In an eighth form, the operation part has a flat surface equipped with the operation keys. The display part has a flat surface provided with the image display panel. The surface equipped with the operation keys and the surface provided with the image display panel are disposed with a step therebetween.

In the foregoing electronic devices of various forms, a reflecting sheet for the connecting part may be disposed to cover at least one of two opposite sides of the connecting part of the lightguide plate in the joint part. The reflecting sheet prevents leakage of light from the joint part.

In addition, the present invention provides a lightguide plate for use in an electronic device having a display part provided with an image display panel, a operation part provided with operation keys, and a joint part that connects together the display part and the operation part. The lightguide plate has a display illuminating part disposed in the display part to illuminate the image display panel, a key illuminating part disposed in the operation part to illuminate the operation keys, and a pliable connecting part disposed in the joint part to connect together the display illuminating part and the key illuminating part and to guide light therebetween.

In addition, the present invention provides a lightguide plate for use in an electronic device including a casing having a display part provided with an image display panel, a operation part provided with operation keys, and a joint part that connects together the display part and the operation part. The casing has at least either one of curved deformation and bent deformation. The lightguide plate has a display illuminating part disposed in the display part to illuminate the image display panel, a key illuminating part disposed in the operation part to illuminate the operation keys, and a connecting part disposed in the joint part to connect together the display illuminating part and the key illuminating part and to guide light therebetween. The lightguide plate is deformable in accordance with the deformation of the casing.

Embodiments of the present invention will be explained below with reference to the accompanying drawings. It should be noted that the scale of the figures used in the following explanation is properly changed to show each member in a recognizable size.

BRIEF DESCRIPTION OF THE DRAWINGS

FIG. 2 is a diagram showing a lightguide plate used in the electronic device shown in FIG. 1, in which part (a) is a perspective view of the lightguide plate, and part (b) is a side view of the lightguide plate.

FIG. 6 is a diagram showing a lightguide plate used in the electronic device shown in FIG. 5, in which part (a) is a perspective view of the lightguide plate, and part (b) is a side plan view of the lightguide plate.

DETAILED DESCRIPTION OF THE INVENTION

Figure 1:
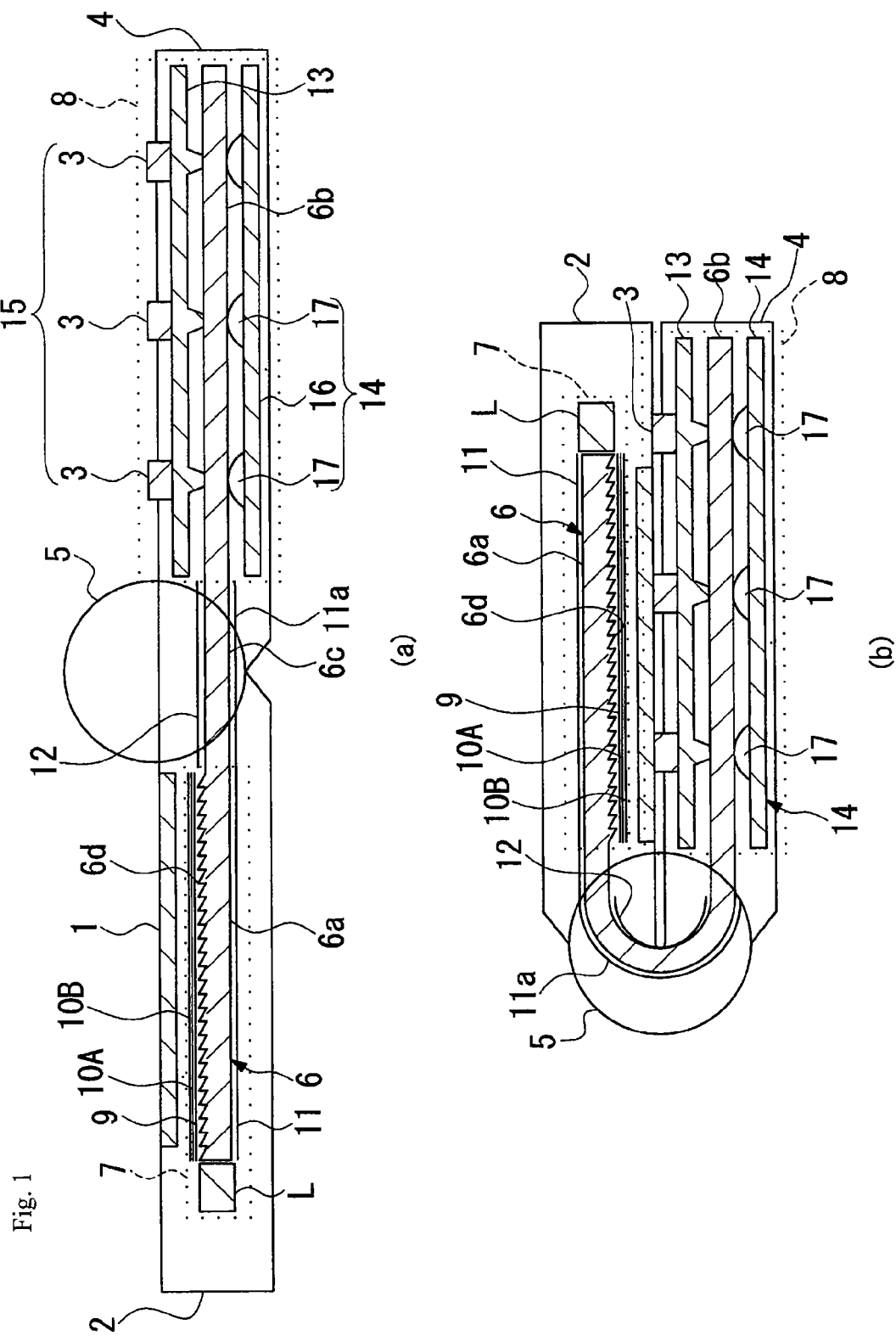
FIG. 1 is a schematic sectional view showing a foldable electronic device (mobile phone) according to a first embodiment of the present invention, in which part (a) shows the electronic device in an unfolded position, and part (b) shows the electronic device in a folded position.

FIG. 1 shows an electronic device according to a first embodiment of the present invention. The electronic device is a foldable, clamshell mobile phone having a display part 2 provided with a liquid crystal display panel (image display panel) 1, an operation part 4 provided with operation keys 3, and a joint part that connects together the display part 2 and the operation part 4. In this embodiment, the joint part is a hinged joint part 5 for hinged connection between the display part 2 and the operation part 4. The electronic device has LED light sources (light source) L, a backlight unit 7 having a lightguide plate 6 that receives light from the LED light sources L at an edge of the lightguide plate 6 and guides the light therethrough, and a key operation unit 8 that is a switch module provided in the operation part 4 and having the operation keys 3.

When the electronic device is in an unfolded position as shown in part (a) of FIG. 1, the liquid crystal display panel 1 and the operation keys 3 face in the same direction. Accordingly, the user can see the liquid crystal display panel 1 while operating the operation keys 3. In a folded position of the electronic device as shown in part (b) of FIG. 1, the liquid crystal display panel 1 and the operation keys 3 face each other and are concealed inside the electronic device.

The lightguide plate 6 has, as shown in FIGS. 1 and 2, a display illuminating part 6a that illuminates the liquid crystal display panel 1, a key illuminating part 6b that illuminates the operation keys 3, and a pliable film-shaped connecting part 6c that is disposed in the hinged joint part 5 to connect together the display illuminating part 6a and the key illuminating part 6b and to guide light therebetween.

The lightguide plate 6 is in the shape of a pliable film as a whole and made of a light-transmitting material. The lightguide plate 6 receives light from the LED light sources L through an end edge surface thereof and guides the light throughout it. Further, the lightguide plate 6 performs optical path conversion to emit planar illuminating light from a light exiting surface (upper surface in this embodiment) thereof toward an object to be illuminated. It should be noted that the thickness of the lightguide plate 6 is, for example, about 125 µm.

The lightguide plate 6 has on the surface of the display illuminating part 6a a multiplicity of microscopic optical configurations 6d, e.g. elongated prisms having a triangular sectional configuration, or convex dots. The key illuminating part 6b also has on the surface thereof microscopic optical configurations 6d, e.g. white printed dots. It should be noted that the surface of the connecting part 6c may also be provided with microscopic optical configurations 6d according to need.

Specifically, the lightguide plate 6 may have a substrate layer (not shown) and resin layers (not shown) formed on the upper and lower sides of the substrate layer, for example. In this case, the upper resin layer has a plurality of microscopic optical configurations 6d formed on a surface thereof to perform optical path conversion.

The substrate layer is formed of a transparent polycarbonate or acrylic resin, for example. The substrate layer is film-formed into a flat film shape by using roll forming process, for example. The resin layers are formed as follows. A coating of photo-setting organic resin that sets upon irradiation with ultraviolet radiation, e.g. one selected from among acrylic, urethane, urethane acrylate and epoxy acrylate resins, is applied to the surface of the substrate layer, and microscopic optical configurations 6d are formed on the surface of the resin coating by using a die. Thereafter, the resin coating is set by irradiation with ultraviolet radiation.

In the actual practice, a large-sized film formed as stated above is cut with a press or a cutter to obtain a film-shaped lightguide plate 6 of a predetermined shape and size.

The backlight unit 7 for the liquid crystal display panel 1 includes LED light sources (light source) L, a display illuminating part 6a, a diffusing sheet 9 stacked over the upper side of the display illuminating part 6a, a combination of a first prism sheet 10A and a second prism sheet 10B, and a reflecting sheet 11 disposed at least underneath the display illuminating part 6a.

The diffusing sheet 9 is formed, for example, by dispersing silica particles or the like into a transparent resin such as an acrylic resin, or a polycarbonate resin.

The first prism sheet 10A and the second prism sheet 10B are transparent sheet-shaped members that collect light from the diffusing sheet 9 and direct it upward. The first and second prism sheets 10A and 10B have on their upper sides a plurality of mutually parallel and elongated prisms. The respective prisms of the first and second prism sheets 10A and 10B are disposed to intersect each other as viewed from above the prism sheets 10A and 10B, i.e. in plan view. To increase the upward directivity of light transmitted through the first and second prism sheets 10A and 10B, the prisms of the first prism sheet 10A are set in a direction perpendicular to the optical axis of light emitted from the LED light sources L and traveling through the film-shaped lightguide plate 6 from one end toward the other end thereof, and the prisms of the second prism sheet 10B are set parallel to the optical axis of light from the LED light sources L. Also, the key illuminating part 6b may be provided with a diffusing sheet 9 and prism sheets 10A and 10B, if necessary. In this case, the diffusing sheet 9 and the prism sheets 10A and 10B provided for the key illuminating part 6b may be integrally formed with the diffusing sheet 9 and the prism sheets 10A and 10B, respectively, of the display illuminating part 6a.

The LED light sources L are white LEDs mounted on a substrate (not shown) for light source. Each white LED is, for example, a semiconductor light-emitting element mounted on a substrate and sealed with a resin material. The semiconductor light-emitting element is, for example, a blue (wavelength λ: 470 to 490 nm) LED element or an ultraviolet (wavelength λ: less than 470 nm) LED element, which is formed by stacking a plurality of semiconductor layers of a gallium nitride compound semiconductor (e.g. InGaN compound semiconductor) on an insulating substrate, e.g. a sapphire substrate.

The resin material used to seal the semiconductor light-emitting element is formed by adding, for example, a YAG fluorescent substance into a silicone resin which is a main component. The YAG fluorescent substance converts blue or ultraviolet light from the semiconductor light-emitting element into yellow light, and white light is achieved by mixing effect of lights having different wavelengths. It should be noted that various LED elements in addition to those described above can be used as the white LEDs.

The liquid crystal display panel 1 is a transmissive or semitransmissive liquid crystal display panel. In the case of a semitransmissive liquid crystal display panel 1, for example, it has a panel body having a liquid crystal material, e.g. TN liquid crystal or STN liquid crystal, sealed with a sealant in a gap between an upper substrate and a lower substrate, each having a transparent electrode layer, an alignment film and a polarizer. The semitransmissive liquid crystal display panel 1 further has a semitransmitting-reflecting sheet having both light-transmitting and -reflecting functions, and the semitransmissive liquid crystal display panel is provided underneath the panel body.

The hinged joint part 5 is preferably deformable from a 180° unfolded position where the display part 2 and the operation part 4 are completely open, to a folded position where the two casing parts 2 and 4 are completely closed. The hinged joint part 5 is preferably further capable of keeping any angle position between the folded and unfolded positions.

A reflecting sheet 12 for the connecting part 6c is disposed at the upper side of the connecting part 6c. An extension 11a of the reflecting sheet 11 is disposed at the lower side of the connecting part 6c.

The reflecting sheet 11 and the reflecting sheet 12 for the connecting part 6c are each a pliable metal sheet, film or foil having a light-reflecting function. In this embodiment, a film provided with an evaporated silver layer is employed as each of the reflecting sheets 11 and 12. It should be noted that an evaporated aluminum layer or the like may be used in place of the evaporated silver layer.

The key operation unit 8 has a plurality of operation keys 3, at least a part of each of which is transparent or semitransparent, a key sheet 13 disposed underneath the operation keys 3 and having on the lower side thereof projections corresponding to the operation keys 3, and a switching mechanism 14 disposed directly below the key sheet 13 and underneath the key illuminating part 6b.

The operation keys 3 have numerals or letters displayed thereon for the user to enter a phone number, etc. A plurality of operation keys 3 constitute a key top 15.

The switching mechanism 14 comprises, for example, a switch substrate 16 disposed directly below the operation keys 3 and the key illuminating part 6b, and tact switches 17 disposed on the switch substrate 16. When one operation key 3 is depressed, the corresponding tact switch 17 is pressed through the corresponding projection of the key sheet 13 and the pliable key illuminating part 6b to perform an ON/OFF operation.

The lightguide plate 6 in this embodiment has a pliable connecting part 6c disposed in the hinged joint part 5 to connect together the display illuminating part 6a and the key illuminating part 6b and to guide light therebetween. Therefore, a part of light guided through the display illuminating part 6a can be further guided into the key illuminating part 6b through the connecting part 6c to simultaneously illuminate both the liquid crystal display panel 1 and the operation keys 3. Further, because the connecting part 6c is pliable, it can guide light without being broken when the electronic device is folded or unfolded.

Further, because the hinged joint part 5 is mainly provided with only the pliable film-shaped connecting part 6c, the structure thereof is relatively simple. Accordingly, the freedom for structural design increases, and size and thickness reductions can be achieved.

Further, the lightguide plate 6 is in the shape of a film and can be curved and bent as a whole. Therefore, the lightguide plate 6 can be mounted compatibly with a variety of liquid crystal display panels 1 and operation keys 3 having various shapes and forms. In addition, the lightguide plate 6 enables reductions in thickness and weight of the electronic device.

Further, in the electronic device employing the lightguide plate 6, the reflecting sheet 12 for the connecting part 6c and the extension 11a of the reflecting sheet 11 are disposed at the upper and lower sides of the connecting part 6c. Therefore, the reflecting sheet 12 and the reflecting sheet extension 11a reflect a part of light leaking to the outside from the connecting part 6c back into the connecting part 6c. Accordingly, it is possible to guide light between the display illuminating part 6a and the key illuminating part 6b at a higher efficiency.

Further, in this electronic device, the LED light sources L are disposed at the side of the lightguide plate 6 closer to the display illuminating part 6a. Therefore, the lightguide plate 6 receives light from its side closer to the display illuminating part 6a and can optimally illuminate the liquid crystal display panel 1, which is required to have a high luminance.

Accordingly, in this electronic device, both the liquid crystal display panel 1 and the operation keys 3 can be illuminated with a single lightguide plate 6 despite the fact that the electronic device is foldable, and thickness and weight reductions can be achieved.

Other embodiments of the present invention will be explained below. It should be noted that in the following embodiments the same constituent elements as those explained in the foregoing first embodiment are denoted by the same reference numerals as used in the first embodiment, and a description thereof is omitted herein.

Figure 3:
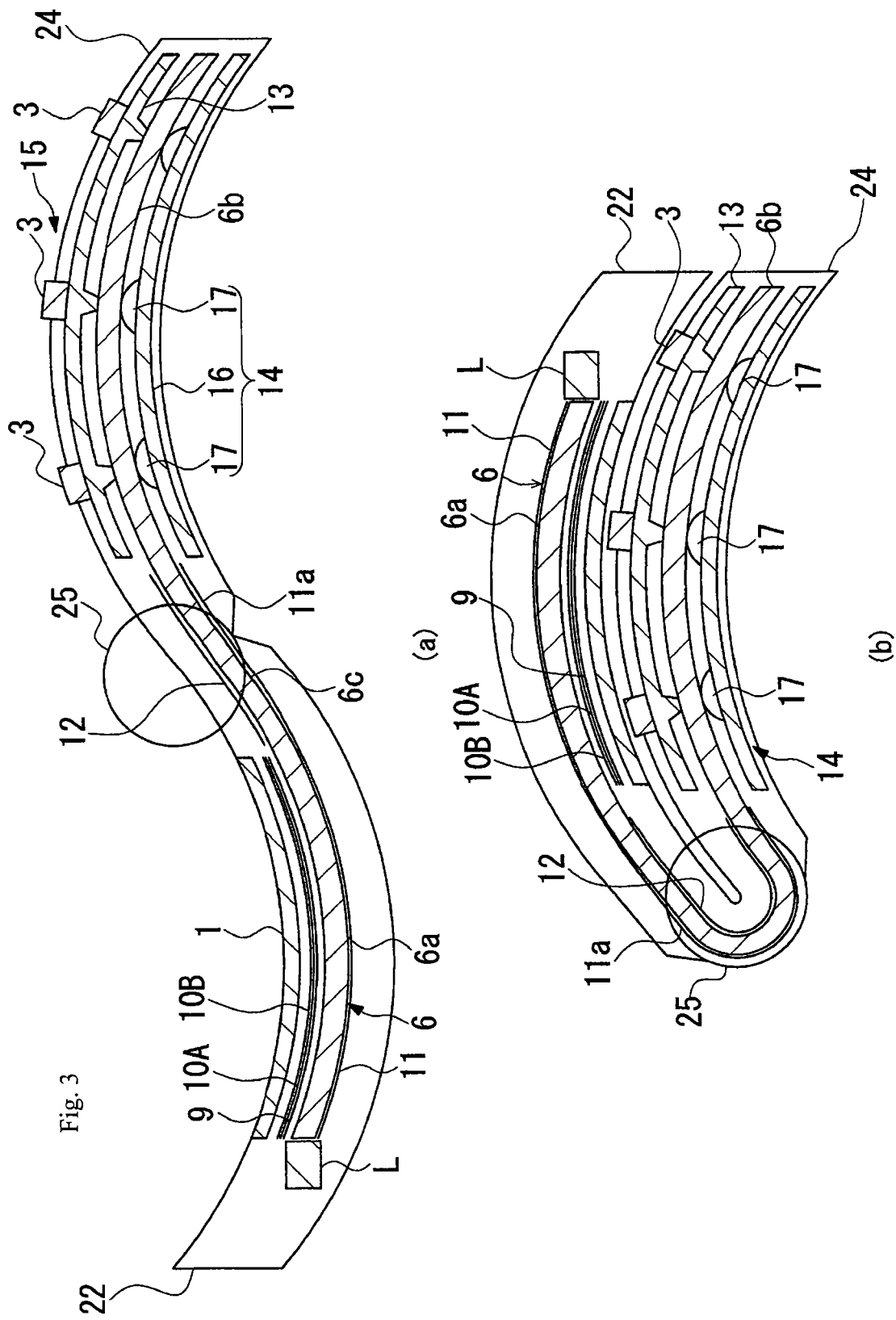
FIG. 3 is a schematic sectional view showing a foldable electronic device according to a second embodiment of the present invention, in which part (a) shows the electronic device in an unfolded position, and part (b) shows the electronic device in a folded position.

A second embodiment shown in FIG. 3 differs from the first embodiment as follows. In an electronic device of the second embodiment, a display part 22 and a operation part 24, each having an arcuately curved sectional configuration, are foldably connected together through a hinged joint part 25. That is, the electronic device of the second embodiment is a mobile phone having an S-shaped sectional configuration as a whole when unfolded. When folded, the mobile phone has an arcuate sectional configuration as a whole.

It should be noted that the lightguide plate 6 is in the shape of a pliable film as a whole. Therefore, the lightguide plate 6 can be disposed in a curved form along the above-described curved configurations of the display part 22 and the operation part 24. In the second embodiment, the display illuminating part 6a and the key illuminating part 6b are also capable of guiding light therebetween irrespective of whether the mobile phone is folded or unfolded.

Figure 4:
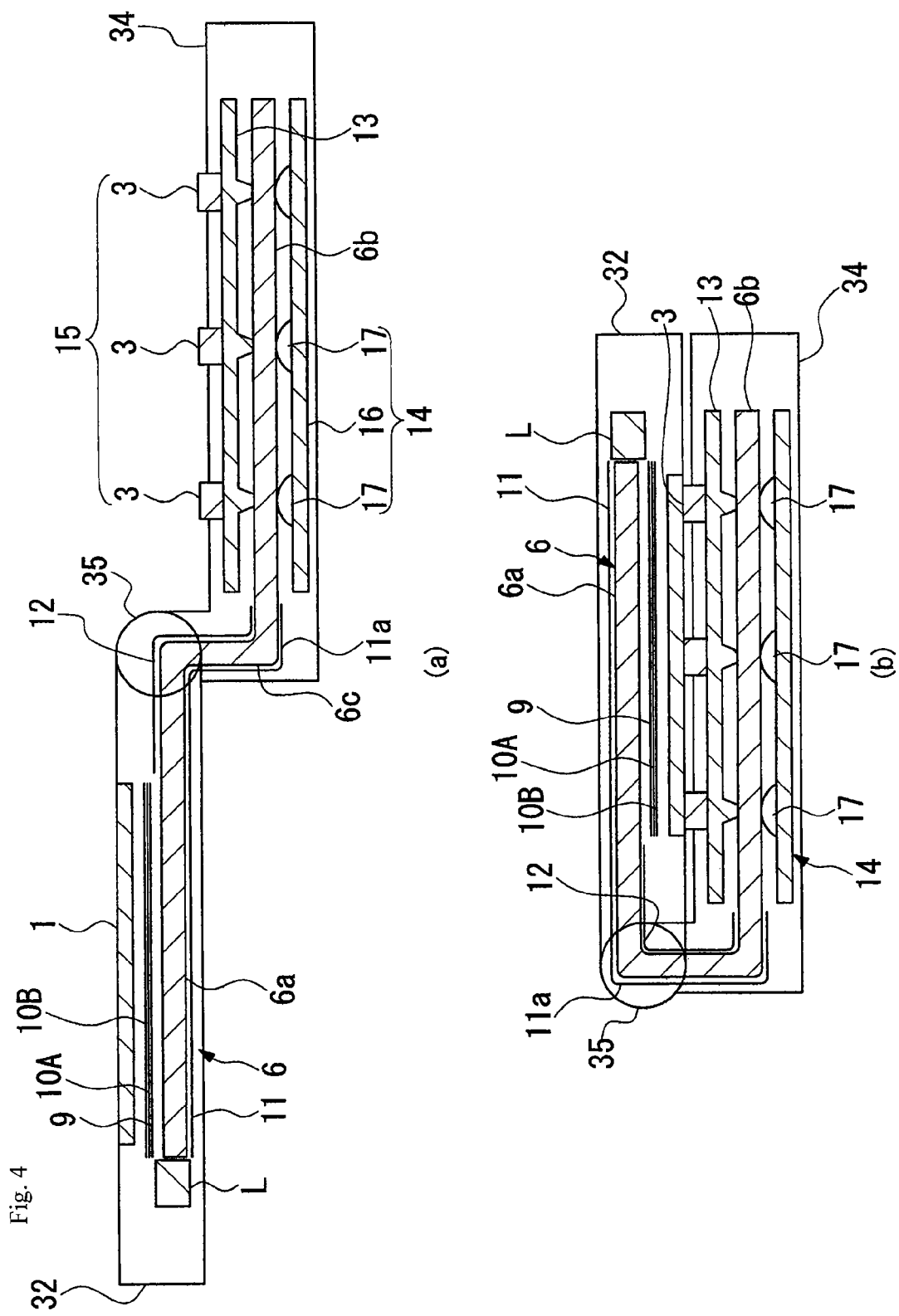
FIG. 4 is a schematic sectional view showing a foldable electronic device according to a third embodiment of the present invention, in which part (a) shows the electronic device in an unfolded position, and part (b) shows the electronic device in a folded position.

A third embodiment shown in FIG. 4 differs from the first embodiment as follows. In an electronic device of the third embodiment, a flat plate-shaped display part 32 and a flat plate-shaped operation part 34 are connected together through a hinged joint part 35 with a step therebetween when the electronic device is unfolded. When the electronic device is folded, the display part 32 and the operation part 34 are bent toward each other through the hinged joint part 35 into a U-shaped sectional configuration as a whole.

Electronic devices according to fourth to tenth embodiments shown in FIGS. 5 to 13 differ from the foldable electronic devices according to the foregoing embodiments in that the electronic devices of the fourth to tenth embodiments are substantially straight mobile phones which are not assumed to be in a folded position and in which a display part provided with a liquid crystal display panel 1 and a operation part are connected together into one unit through a joint part. However, the basic specifications and functions of the constituent elements of the electronic devices of the fourth to tenth embodiments are the same as those of the foregoing embodiments, except the following points.

Figure 5:
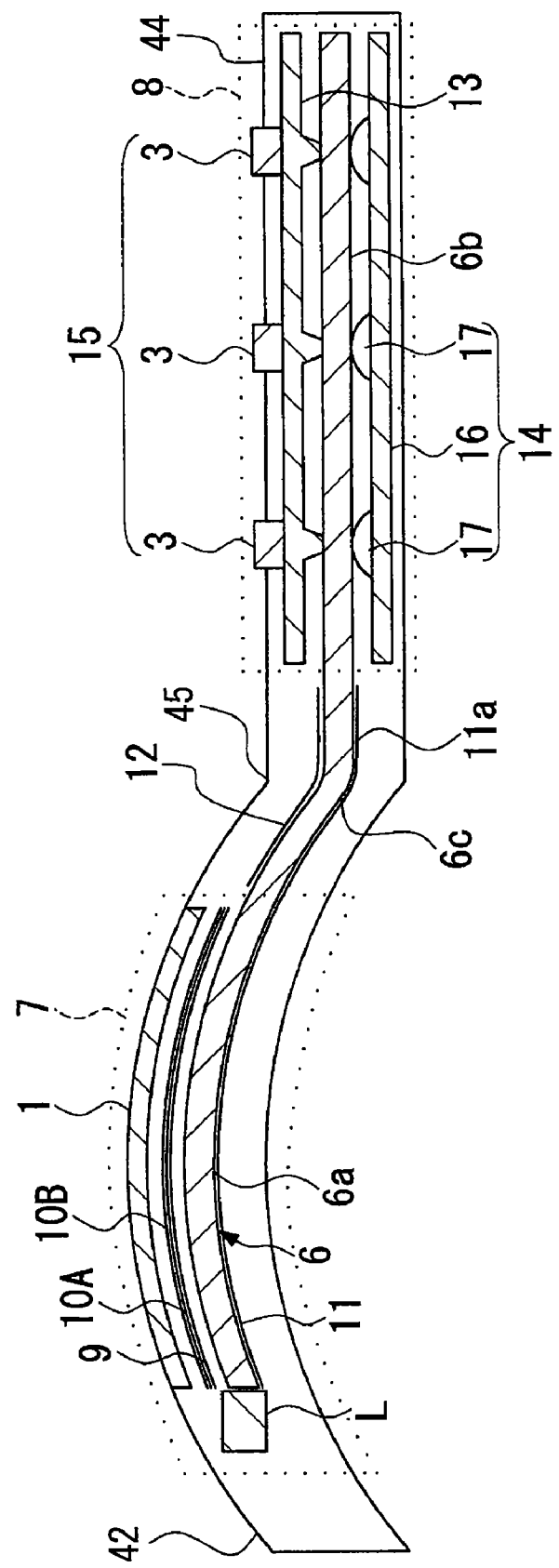
FIG. 5 is a schematic sectional view showing a substantially straight electronic device (mobile phone), which is not folded into two, according to a fourth embodiment of the present invention.

In an electronic device according to the fourth embodiment shown in FIG. 5, a display part 42 has an arcuate sectional configuration that is convexly curved at a side thereof closer to a liquid crystal display panel 1. The display part 42 is connected to a flat plate-shaped operation part 44 into one unit through a joint part 45. Constituent elements that are mounted in the display part 42, i.e. a liquid crystal display panel 1, a lightguide plate 6, a diffusing sheet 9, first and second prism sheets 10A and 10B, and a reflecting sheet 11, are curved with substantially the same curvature as that of the display part 42. The lightguide plate 6 is a thin sheet-shaped member as shown in FIG. 6, as in the case of the foregoing embodiments, before it is disposed in the electronic device.

Figure 7:
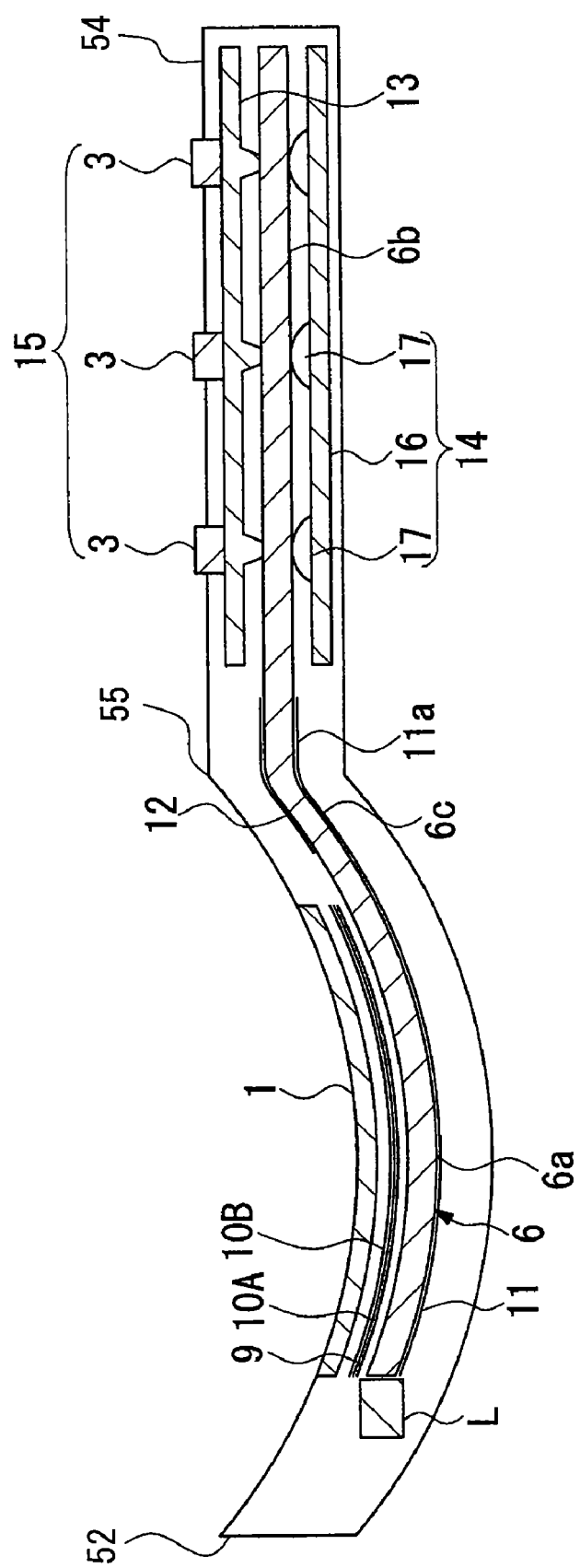
FIG. 7 is a schematic sectional view showing an electronic device according to a fifth embodiment of the present invention.

An electronic device according to the fifth embodiment shown in FIG. 7 differs from the electronic device of the fourth embodiment in that a display part 52 has an arcuate sectional configuration that is concavely curved at a side thereof closer to a liquid crystal display panel 1, and the display part 52 is connected to a flat plate-shaped operation part 54 into one unit through a joint part 55.

Figure 8:
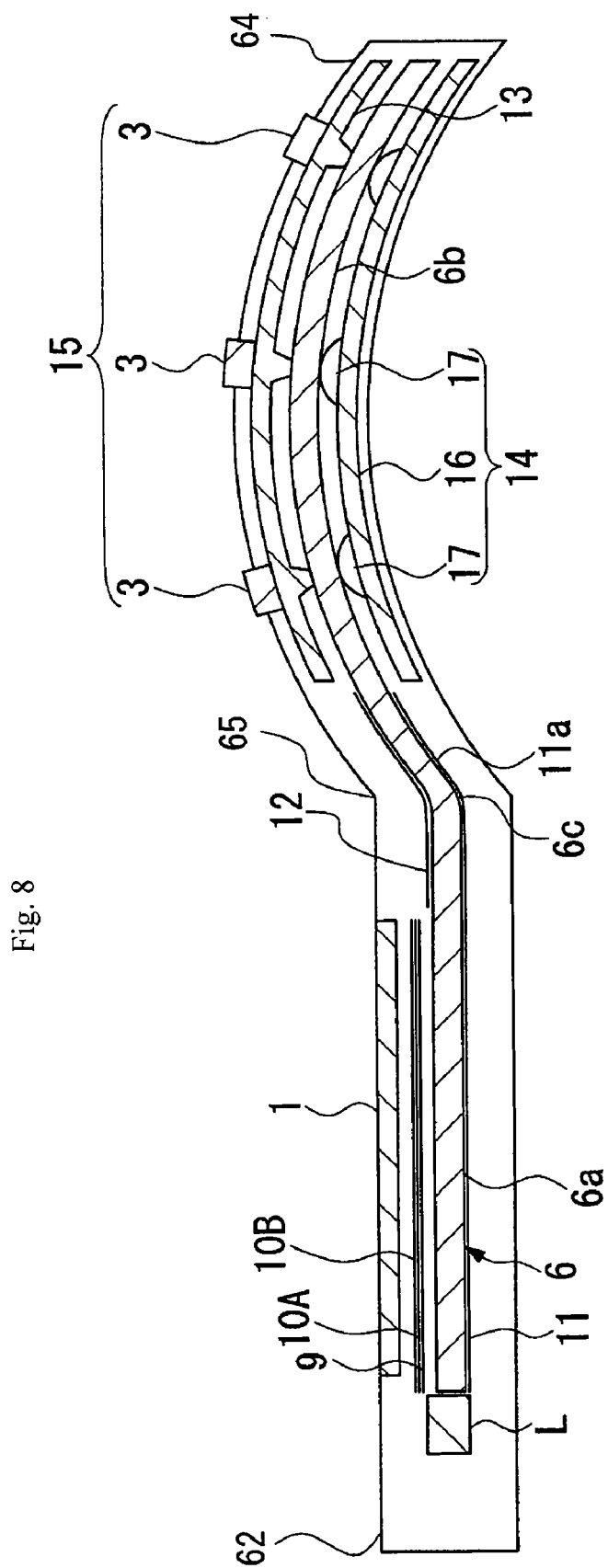
FIG. 8 is a schematic sectional view showing an electronic device according to a sixth embodiment of the present invention.

An electronic device according to the sixth embodiment shown in FIG. 8 differs from the electronic device of the fourth embodiment in that a operation part 64 has an arcuate sectional configuration that is convexly curved at a side thereof closer to operation keys 3, and the operation part 64 is connected to a flat plate-shaped display part 62 into one unit through a joint part 65.

Figure 9:
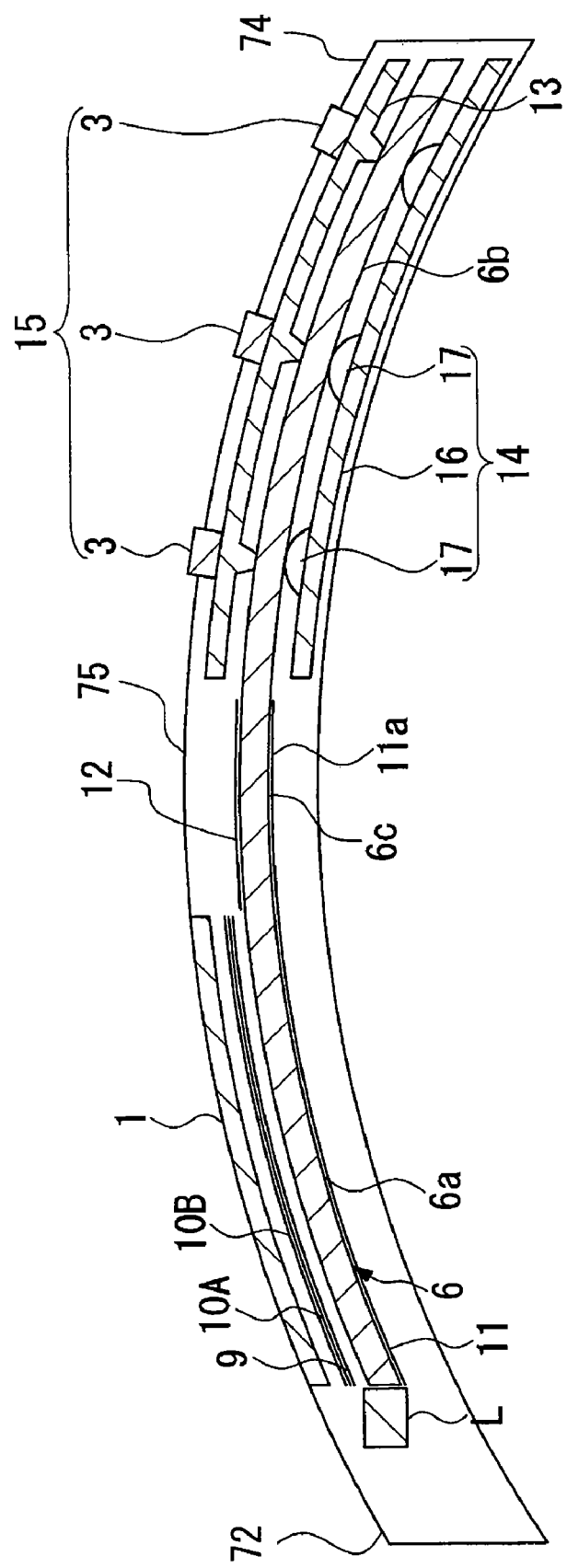
FIG. 9 is a schematic sectional view showing an electronic device according to a seventh embodiment of the present invention.

In the seventh embodiment shown in FIG. 9, a display part 72 and an operation part 74 are convexly curved at their respective sides closer to a liquid crystal display panel 1 and operation keys 3 and connected together through a joint part 75. Thus, the electronic device is curved as a whole. Conversely to this, the display part 72 and the operation part 74 may be concavely curved at their respective sides closer to the liquid crystal display panel 1 and the operation keys 3 so that the electronic device is curved as a whole.

Figure 10:
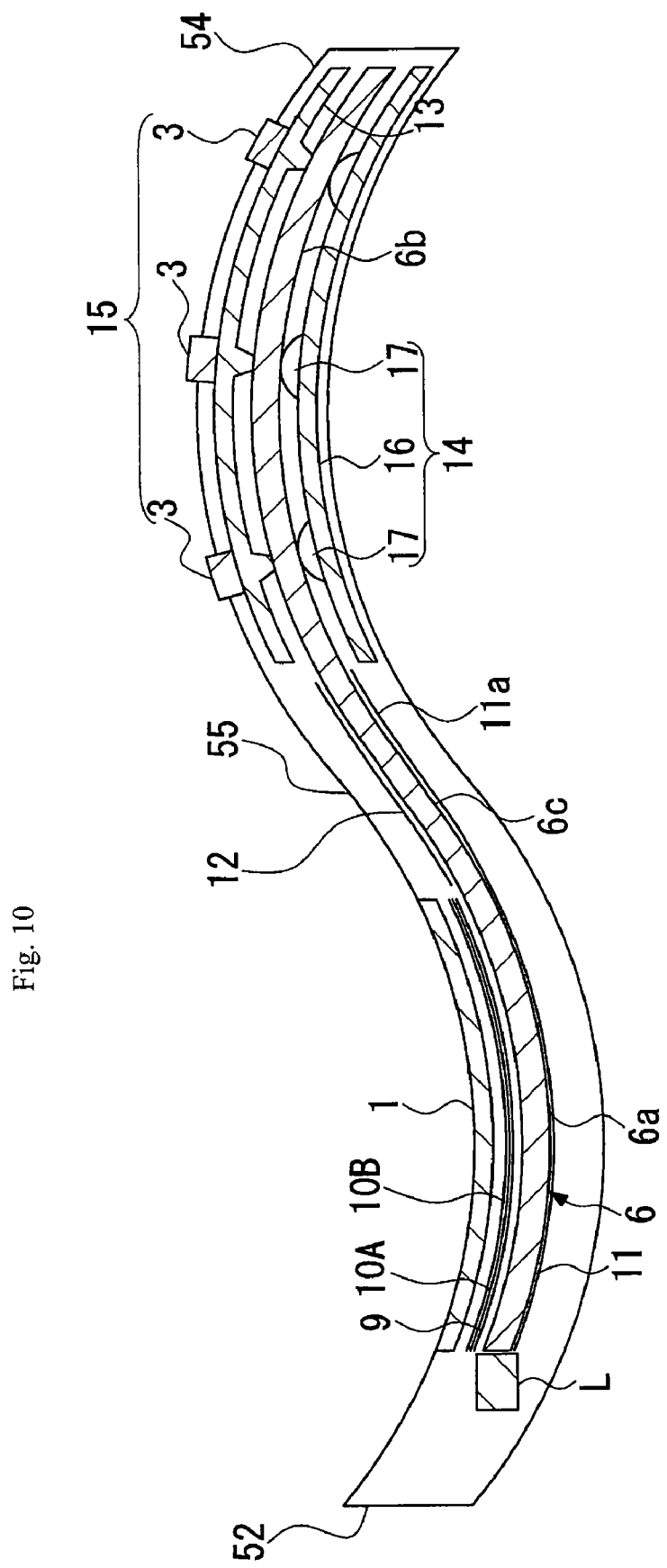
FIG. 10 is a schematic sectional view showing an electronic device according to an eighth embodiment of the present invention.

In an electronic device according to the eighth embodiment shown in FIG. 10, a display part 82 has an arcuate sectional configuration that is concavely curved at a side thereof closer to a liquid crystal display panel 1, and a operation part 84 has an arcuate sectional configuration that is convexly curved at a side thereof closer to operation keys 3. A modification of the eighth embodiment may be as follows. The display part has an arcuate sectional configuration that is convexly curved at a side thereof closer to the liquid crystal display panel 1, and the operation part has an arcuate sectional configuration that is concavely curved at a side thereof closer to the operation keys 3.

Figure 11:
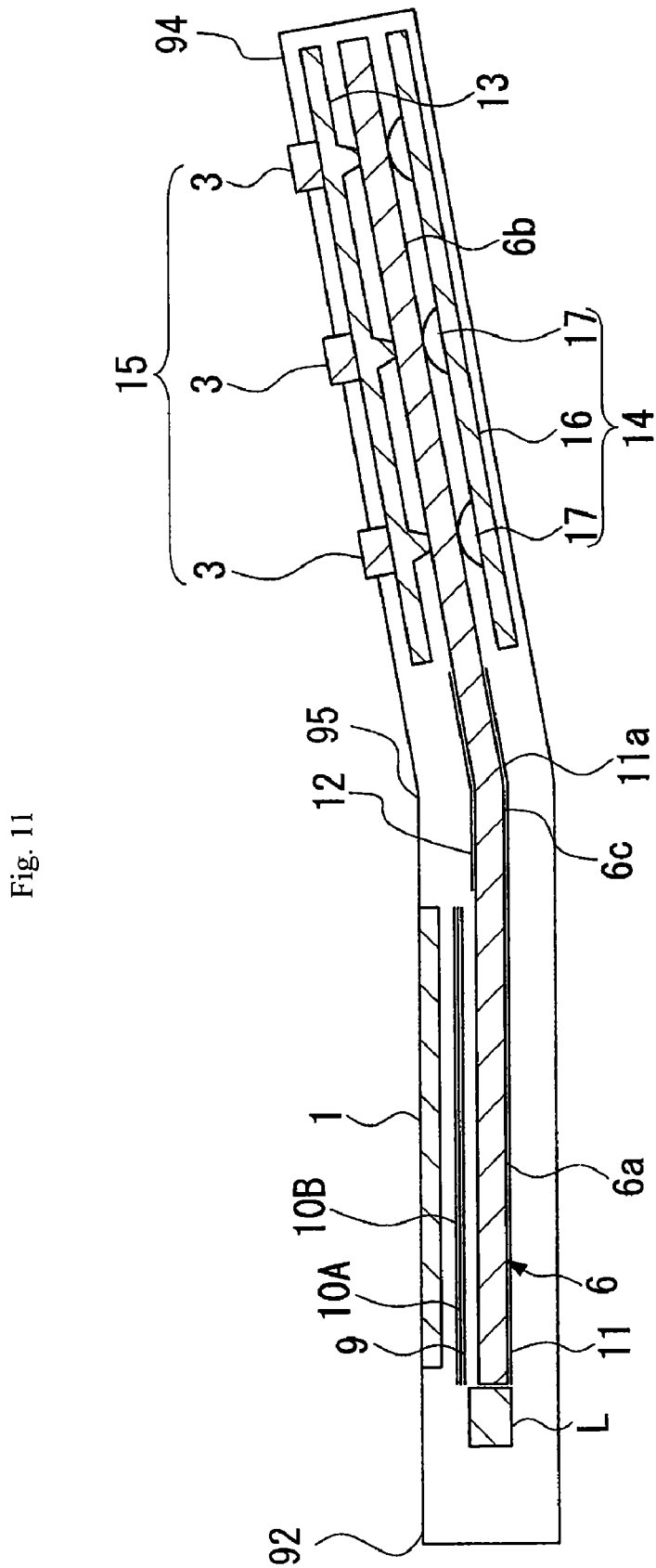
FIG. 11 is a schematic sectional view showing an electronic device according to a ninth embodiment of the present invention.

The ninth embodiment shown in FIG. 11 differs from the fourth embodiment in that a flat plate-shaped display part 92 and a flat plate-shaped operation part 94 are connected together with a predetermined angle therebetween through a joint part 95.

Figure 12:
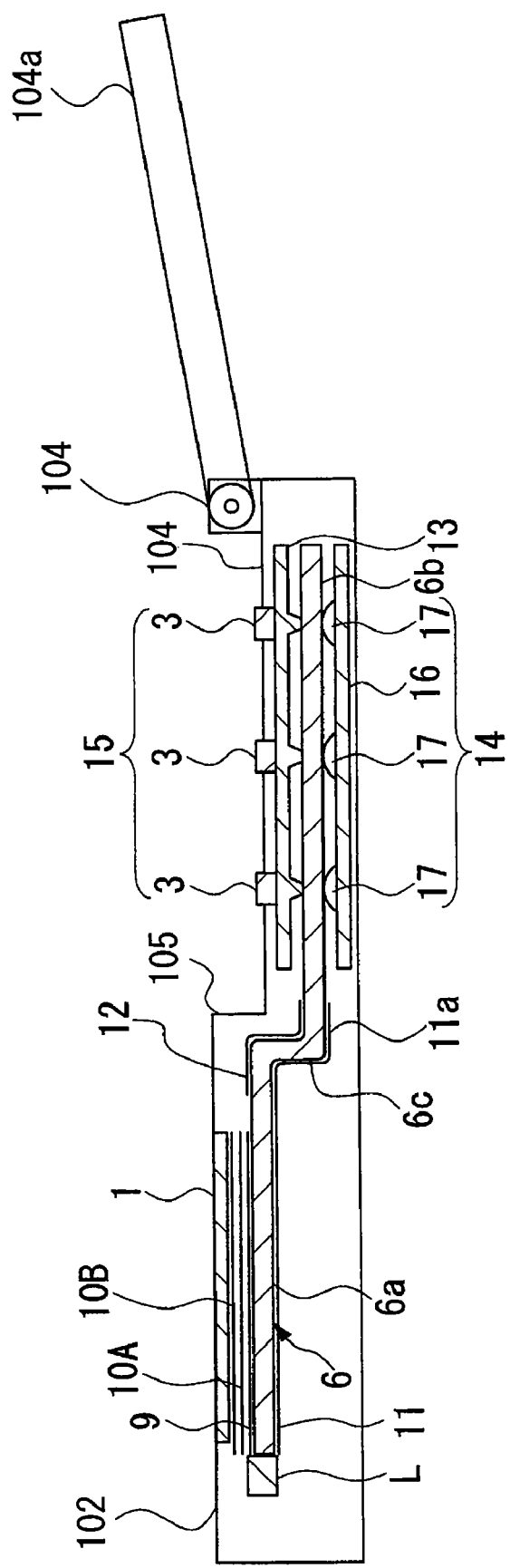
FIG. 12 is a schematic sectional view showing an electronic device according to a tenth embodiment of the present invention.

In an electronic device of the tenth embodiment shown in FIG. 12, a display part 102 and a operation part 104 are connected together through a joint part 105 with a step therebetween. The operation part 104 has a key cover 104a, which is attached thereto openably and closably through a cover hinge part 104b.

In the electronic device of the tenth embodiment, the operation part 104 is thinner than the display part 102 by an amount corresponding to the thickness of the key cover 104a because the surface of the key cover 104a and the surface of the liquid crystal display panel 1 are substantially flush with each other when the key cover 104a is closed.

It should be noted that the present invention is not necessarily limited to the foregoing embodiments but can be modified in a variety of ways without departing from the scope of the present invention.

For example, in the foregoing embodiments, the LED light sources L are disposed along an end edge of the lightguide plate 6 that is closer to the display illuminating part 6a, as stated above. However, the LED light sources L may be disposed along an end edge of the lightguide plate 6 that is closer to the key illuminating part 6b to increase the luminance at the operation key side of the lightguide plate 6. It is also possible to dispose LED light sources L along both the end edges of the lightguide plate 6 that are closer to the display illuminating part 6a and the key illuminating part 6b, respectively.

In the foregoing embodiments, reflecting sheets, i.e. the reflecting sheet 12 for the connecting part 6c and the extension 11a of the reflecting sheet 11, are provided at both the upper and lower sides of the connecting part 6c of the lightguide plate 6. However, only either one of the upper and lower sides of the connecting part 6c may be covered with a reflecting sheet. It should be noted that both the reflecting sheet 12 and the extension 11a of the reflecting sheet 11 may be omitted, provided that leakage of light to the outside from the connecting part 6c of the lightguide plate 6 can be reduced by some method.

Although the lightguide plate 6 is preferably in the shape of a film as a whole, as stated above, it is also possible to form a lightguide plate 6 by connecting together a film-shaped display illuminating part 6a and a film-shaped key illuminating part 6b into one unit through a film-shaped connecting part 6c.

The diffusing sheet 9 used in the backlight unit of the foregoing embodiments may be omitted. Although two prism sheets are used in the foregoing embodiments, the backlight unit may have only one prism sheet.

Although in the foregoing embodiments the present invention is applied to a mobile phone, the present invention may be applied to other various electronic devices, e.g. personal digital assistants (PDAs), mobile personal computers (PCs), etc.

Although in the foregoing embodiments the liquid crystal display panel 1 is employed as an image display panel, other types of image display panels may be used, for example, an electronic paper. In this case, the display illuminating part of the lightguide plate according to the present invention is disposed as a part of a front light unit at the front side of the electronic paper body.

Figure 13:
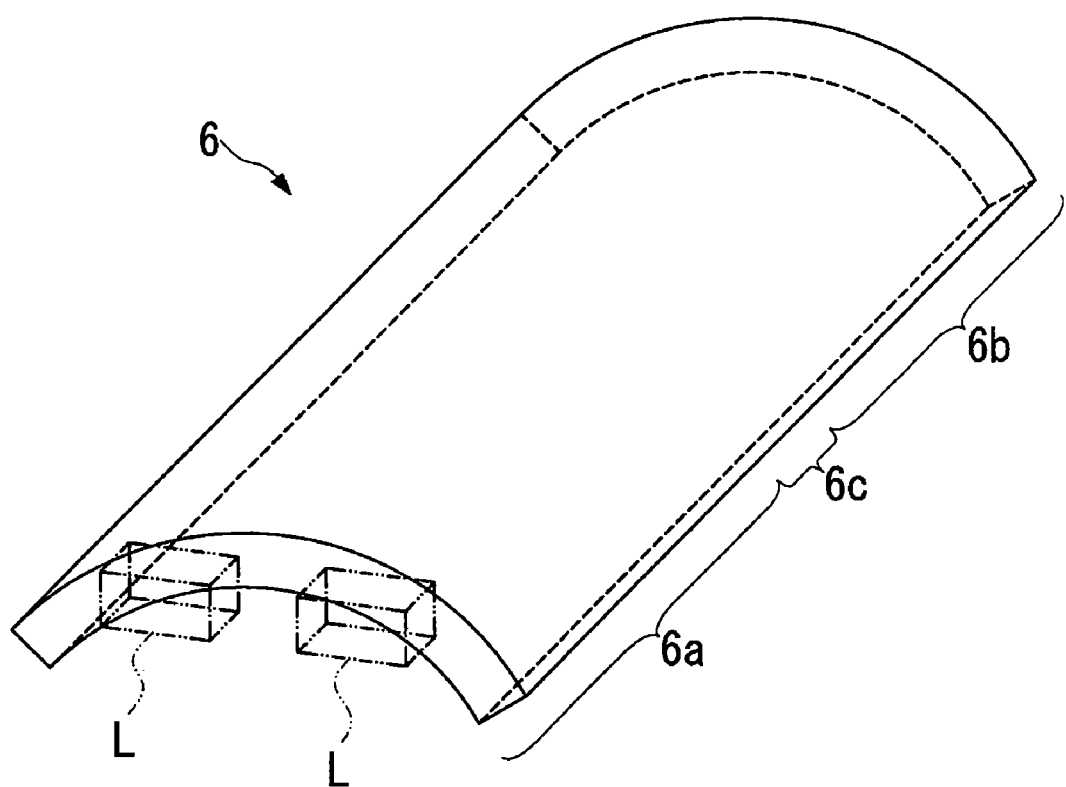
FIG. 13 is a perspective view showing a lightguide plate of the electronic device according to the fourth to tenth embodiments of the present invention.

Although in the fourth to tenth embodiments the casing is curved or bent or has a stepped configuration as seen in a side view, the casing may be curved or bent or have a stepped configuration as seen from another direction. For example, the casing may be curved as shown in FIG. 13 in a sectional view taken in a direction perpendicular to the longitudinal direction thereof.

What is claimed is:

1. An electronic device comprising:
   a casing having a display part provided with an image display panel, an operation part provided with operation keys, and a joint part that connects together the display part and the operation part; and
   a lightguide plate having a display illuminating part disposed in the display part of the casing to illuminate the image display panel, a key illuminating part disposed in the operation part of the casing to illuminate the operation keys, and a connecting part disposed in the joint part of the casing to connect together the display illuminating part and the key illuminating part and to guide light between the display illuminating part and the key illuminating part, the lightguide plate being deformable in accordance with deformation of the casing.

2. The electronic device of claim 1, wherein the display part and the operation part are hingedly connected together at the joint part.

3. The electronic device of claim 1, wherein the connecting part of the lightguide plate is in the shape of a pliable film.

4. The electronic device of claim 1, wherein the lightguide plate is in the shape of a pliable film as a whole.

5. The electronic device of claim 1, wherein the lightguide plate is disposed to receive light from at least one of opposite end edges adjacent to the display part and the operation part, and the lightguide plate guides the light from the at least one end edge toward the corresponding other opposite end edge.

6. The electronic device of claim 1, further comprising:
   a reflecting sheet at the connecting part and disposed to cover at least either one of two opposite sides of the connecting part which is disposed in the joint part of the casing.

7. The electronic device of claim 2, wherein the display part and the operation part are in the shape of a flat plate, respectively.

8. The electronic device of claim 2, wherein the display part has a surface provided with the image display panel;
   the operation part having a surface equipped with the operation keys;
   the display part and the operation part being displaceable between a folded position and an unfolded position, and the surface provided with the image display panel and the surface equipped with the operation keys are adjacently disposed each other in the folded position and the surface provided with the image display panel and the surface equipped with the operation keys are disposed apart from each other in the unfolded position.

9. The electronic device of claim 8, wherein, in the unfolded position, the surface provided with the image display panel and the surface equipped with the operation keys are substantially flush with each other.

10. The electronic device of claim 8, wherein the display part and the operation part are connected together and held with a step therebetween in the unfolded position.

11. The electronic device of claim 2, wherein the display part has a curved surface provided with the image display panel;
   the operation part having a curved surface equipped with the operation keys;
   the display part and the operation part being displaceable between a folded position at the joint part and the surface provided with the image display panel and the surface equipped with the operation keys are juxtaposed to each other, and the surface provided with the image display panel and the surface equipped with the operation keys are disposed apart from each other in the unfolded position.

12. The electronic device of claim 1, wherein the casing is a one-piece casing having at least either one of curved deformation and bent deformation;
   the lightguide plate being deformed in accordance with the deformation of the casing.

13. The electronic device of claim 12, wherein the operation part has a flat surface equipped with the operation keys;
   the display part having a surface provided with the image display panel, the surface facing in a same direction as in that the surface which is equipped with the operation keys facing, and the display part being convexly curved as seen in a side view;
   the lightguide plate being transformed in accordance with configuration of the surface of the operation part and the surface of the display part.

14. The electronic device of claim 12, wherein the operation part has a flat surface equipped with the operation keys;
   the display part having a surface provided with the image display panel, the surface facing in a same direction as in that the surface which is equipped with the operation keys facing, and the display part being concavely curved as seen in a side view;
   the lightguide plate being transformed in accordance with configuration of the surface of the operation part and the surface of the display part.

15. The electronic device of claim 12, wherein the operation part has a surface equipped with the operation keys;
   the display part having a surface provided with the image display panel;
   the surface equipped with the operation keys and the surface provided with the image display panel cooperating to form a continuous surface which is convexly curved as a whole as seen in a side view;
   the lightguide plate being transformed in accordance with configuration of the continuous surface including the surface of the operation part and the surface of the display part.

16. The electronic device of claim 12, wherein the operation part has a surface equipped with the operation keys;
   the display part having a surface provided with the image display panel;
   the surface equipped with the operation keys and the surface provided with the image display panel cooperating to form a continuous surface which is concavely curved as a whole as seen in a side view;
   the lightguide plate being transformed in accordance with configuration of the continuous surface including the surface of the operation part and the surface of the display part.

17. The electronic device of claim 12, wherein the operation part has a convexly curved surface equipped with the operation keys;
   the display part having a concavely curved surface provided with the image display panel;
   the surface equipped with the operation keys and the surface provided with the image display panel cooperate to form a continuous surface curved in an S-shape as a whole as seen in a side view;
   the lightguide plate being transformed in accordance with configuration of continuous surface including the surface of the operation part and the surface of the display part.

18. The electronic device of claim 12, wherein the operation part has a concavely curved surface equipped with the operation keys;

the display part having a convexly curved surface provided with the image display panel;

the surface equipped with the operation keys and the surface provided with the image display panel cooperate to form a continuous surface curved in an S-shape as a whole as seen in a side view;

the lightguide plate being transformed in accordance with configuration of continuous surface including the surface of the operation part and the surface of the display part.

19. The electronic device of claim 12, wherein the operation part has a flat surface equipped with the operation keys;

the display part having a flat surface provided with the image display panel;

the surface equipped with the operation keys and the surface provided with the image display panel being disposed with an angle of intersection therebetween;

the lightguide plate being transformed in accordance with angled configuration formed by the surface of the operation part and the surface of the display part.

20. The electronic device of claim 12, wherein the operation part has a substantially flat surface equipped with the operation keys;

the display part having a substantially flat surface provided with the image display panel;

the surface equipped with the operation keys and the surface provided with the image display panel being disposed with a step therebetween;

the lightguide plate being transformed in accordance with stepped configuration formed by the surface of the operation part and the surface of the display part.

21. The electronic device of claim 12, further comprising:

a reflecting sheet for the connecting part and disposed to cover at least either one of two opposite sides of the connecting part in the joint part of casing.

22. A lightguide plate for use in an electronic device having a display part provided with an image display panel, an operation part provided with operation keys, and a joint part that connects together the display part and the operation part, the lightguide plate comprising:

a display illuminating part disposed in the display part to illuminate the image display panel;

a key illuminating part disposed in the operation part to illuminate the operation keys; and a pliable connecting part disposed in the joint part to connect together the display illuminating part and the key illuminating part and to guide light between the display illuminating part and the key illuminating part.

23. A lightguide plate for use in an electronic device including a casing having a display part provided with an image display panel, an operation part provided with operation keys, and a joint part that connects together the display part and the operation part, the casing having at least either one of curved deformation and bent deformation, the lightguide plate comprising:

a display illuminating part disposed in the display part to illuminate the image display panel;

a key illuminating part disposed in the operation part to illuminate the operation keys; and a connecting part disposed in the joint part to connect together the display illuminating part and the key illuminating part and to guide light between the display illuminating part and the key illuminating part;

the lightguide plate being deformable in accordance with the deformation of the casing.

* * * * *